United States Patent
Rodriguez et al.

(10) Patent No.: US 9,992,492 B2
(45) Date of Patent: Jun. 5, 2018

(54) PROVIDING A COMMON SET OF PARAMETERS FOR SUB-LAYERS OF CODED VIDEO

(71) Applicant: Cisco Technology, Inc., San Jose, CA (US)

(72) Inventors: Arturo A. Rodriguez, Norcross, GA (US); Anil Kumar Katti, Atlanta, GA (US); Hsiang-Yeh Hwang, Duluth, GA (US)

(73) Assignee: Cisco Technology, Inc., San Jose, CA (US)

(*) Notice: Subject to any disclaimer, the term of this patent is extended or adjusted under 35 U.S.C. 154(b) by 513 days.

(21) Appl. No.: 14/050,304

(22) Filed: Oct. 9, 2013

(65) Prior Publication Data

US 2014/0098897 A1 Apr. 10, 2014

Related U.S. Application Data

(60) Provisional application No. 61/712,831, filed on Oct. 12, 2012, provisional application No. 61/711,721, filed on Oct. 9, 2012.

(51) Int. Cl.
*H04N 7/26* (2006.01)
*H04N 19/70* (2014.01)
(Continued)

(52) U.S. Cl.
CPC ....... *H04N 19/00884* (2013.01); *H04N 19/31* (2014.11); *H04N 19/463* (2014.11); *H04N 19/70* (2014.11)

(58) Field of Classification Search
CPC ............. H04N 19/00884; H04N 19/31; H04N 19/463; H04N 19/70
(Continued)

(56) References Cited

U.S. PATENT DOCUMENTS 9,462,268 B2  10/2016  Rodriguez et al.
9,787,984 B2  10/2017  Rodriguez et al.
(Continued)

FOREIGN PATENT DOCUMENTS

CN    969549 A      5/2007
CN    101180883 A   5/2008

OTHER PUBLICATIONS

Bross et al. "High efficiency video coding (HEVC) text specification draft 8", Joint Collaborative Team on Video Coding (JCT-VC) of ITU-T SGI 6 WP3 and ISO/IEC JTC1/SC29/WG11 10th Meeting: Stockholm, SE, Jul. 11-20, 2012, Document JCTVC-J1003_d7.*
(Continued)

*Primary Examiner* — William C Vaughn, Jr.
*Assistant Examiner* — Naod Belai
(74) *Attorney, Agent, or Firm* — Merchant & Gould P.C.

(57) ABSTRACT

Systems and methods disclosed herein may describe methods and systems for generating, receiving, and/or processing a bitstream comprising at least a first coded video stream (CVS), the first CVS comprising a first flag that indicates whether each of a plurality of sub-layers in a coded video sequence has a respectively corresponding set of sub-layer parameters or whether a common set of sub-layer parameters corresponds to the plural sub-layers, wherein each sub-layer corresponds to a respective temporal identifier value.

20 Claims, 5 Drawing Sheets

(51) Int. Cl.
*H04N 19/463* (2014.01)
*H04N 19/31* (2014.01)

(58) Field of Classification Search
USPC .......................................... 375/240, 240.26
See application file for complete search history.

(56) References Cited

U.S. PATENT DOCUMENTS

| | | | |
|---|---|---|---|
| 2014/0098853 A1 | 4/2014 | Rodriguez et al. | |
| 2014/0098896 A1* | 4/2014 | Wang | H04N 19/70 375/240.26 |
| 2014/0301477 A1* | 10/2014 | Deshpande | H04N 19/82 375/240.25 |
| 2015/0131744 A1* | 5/2015 | Samuelsson | H04N 19/70 375/240.26 |
| 2017/0026640 A1 | 1/2017 | Rodriguez et al. | |
| 2017/0353718 A1 | 12/2017 | Rodriguez et al. | |

OTHER PUBLICATIONS

European Office Action dated Feb. 15, 2016 cited in Application No. 13 779711.4, 7 pgs.
Choi et al., "Parameter set design for redundancy removal," Joint Collaborative Team on Video Coding (JCT-VC) of ITU-T SG 16 WP 3 and ISO/IEC JTC 1/SC 291WG 11, 13th Meeting: Incheon, KR, Apr. 18-26, 2013, Document: JCTVC-M0165, XP030114122, pp. 1-5.
Arturo Rodriguez, "Introduction of temporal_id_type", 102. MPEG Meeting; Oct. 15, 2012-Oct. 19, 2012; Shanghai; (Motion Picture Expert Group or ISO/IEC JTC1/SC29/WG11), No. m27025, Oct. 11, 2012 (Oct. 11, 2012), XP030055358.
Boyce J. et al., "High level syntax hooks for future extensions", 99. MPEG Meeting; Feb. 6, 2012-Feb. 10, 2012; San Josa CR; (Motion Picture Expert Group or ISO/IEC JTC1/SC29/WG11), No. m23263, Feb. 10, 2012 (Feb. 10, 2012), XP030051788.
Chen Y. et al., "3-D-HLS: Video parameter set for 3D-HEVC", 1. JCT-3V Meeting; 101. MPEG Meeting; Jul. 16, 2012-Jul. 20, 2012; Stockholm; (The Joint Collaborative Team on 3D Video Coding Extension Development of ISO/IEC JTC1/SC29/WG11 and ITU-T SG. 16); URL: http://phenix.int-evry.fr/jct2/, No. JCT3V-A0099, Jul. 11, 2012 (Jul. 11, 2012), XP030130098.
Y-K Wang et al., "AHG9: On video parameter set", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG. 16); URL: http://wftp3.itu.int/av-arch/jctvc-site/, No. JCTVC-K0125, Oct. 1, 2012 (Oct. 1, 2012), XP030113007.
U.S. Appl. No. 14/050,276, filed Oct. 9, 2013 entitled "Output Management of prior Decoded Pictures at Picture Format Transitions in Bitstreams," Inventor: Rodriguez et al.
Rodriguez et al., "Semantics of no_output_of_prior_pics_flag," 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/, No. JCTVC-K0316, Oct. 6, 2012, 5 pages.
Choi et al., "AHG9: NAL Unit Header Design for Base Spec," 11. JCT-VC Meeting; 102. MPEG Meeting Oct. 10, 2012-Oct. 19, 2012; Shanghai; (Joint Collaborative Teacm on Video Coding of ISO/IEC JTC1/SC29/WG11 and ITU-T SG.16); URL: http://wftp3.itu.int/av-arch/jctvc-site/, No. JCTVC-K0210, Oct. 2, 2012, 5 pages.
International Search Report and Written Opinion dated Dec. 9, 2013 in Application No. PCT/US2013/064180, 17 pages.
Chinese First Office Action dated Apr. 1, 2017 cited in Application No. 201380052543.1, 30 pgs.
Copending U.S. Appl. No. 15/283,727, filed Oct. 3, 2016 entitled "Output Management of Prior Decoded Pictures at Picture Format Transitions in Bitstreams", Inventor: Rodriguez et al.
European Office Action dated Aug. 22, 2016 cited in Application No. 13 784 062.5, 4 pgs.
European Office Action dated Sep. 9, 2016 cited in Application No. 13 779 711.4, 4 pgs.
Ye-Kui Wang et al., "MV-HEVC/SHVC HLS: On VPS and SPS in HEVC 3DV and scalable extensions," Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, Document: JCT3V-D0047-v2, 25 pgs. (re-submission from Supplemental IDS filed Mar. 18, 2014).
Chinese Second Office Action dated Nov. 7, 2017 cited in Application No. 201380052642.X, 8 pgs.
Chinese First Office Action dated Jun. 1, 2017 cited in Application No. 201380052642.X, 18 pgs.
Chinese Second Office Action dated Nov. 29, 2017 cited in Application No. 201380052543.1, 18 pgs.
U.S. Appl. No. 15/685,032, filed Aug. 24, 2017 entitled "Output Management of Prior Decoded Pictures at Picture Format Transitions in Bitstreams", Inventor: Rodriguez et al.

* cited by examiner

300

PROVIDING A COMMON SET OF PARAMETERS FOR SUB-LAYERS OF CODED VIDEO

CROSS-REFERENCE TO RELATED APPLICATIONS

The present application claims the benefit of U.S. Provisional Patent Application No. 61/711,721 entitled "Remapping Banned Picture Type when Disallowing Sub-Layers," filed on Oct. 9, 2012, and also claims the benefit of U.S. Provisional Patent Application No. 61/712,831 entitled "Processing of Pictures in Coded Video Streams," both of which are expressly incorporated herein, in their entirety, by reference.

TECHNICAL FIELD

The present disclosure relates generally to signaling whether each of a plurality of sub-layers in a coded video sequence (CVS) has a respectively corresponding set of sub-layer parameters or a common set of sub-layer parameters is applicable to the plurality sub-layers.

BACKGROUND

In systems that provide video programs such as subscriber television networks, the internet or digital video players, a device capable of providing video services or video playback includes hardware and software necessary to input and process a digital video signal to provide digital video playback to the end user with various levels of usability and/or functionality. The device includes the ability to receive or input the digital video signal in a compressed format, wherein such compression may be in accordance with a video coding specification, decompress the received or input digital video signal, and output the decompressed video signal. A digital video signal in compressed form is referred to herein as a bitstream that contains successive coded video sequences.

Digitally encoded video streams can be received by devices such as set-top boxes and televisions over a transmission channel of some type. During the output of the digitally encoded video stream a determination may be needed as to whether each of the plural sub-layers in a coded video sequence (CVS) has a respectively corresponding set of sub-layer parameters, or a common set of sub-layer parameters is applicable to the plural sub-layers.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

OVERVIEW

Figure 1:
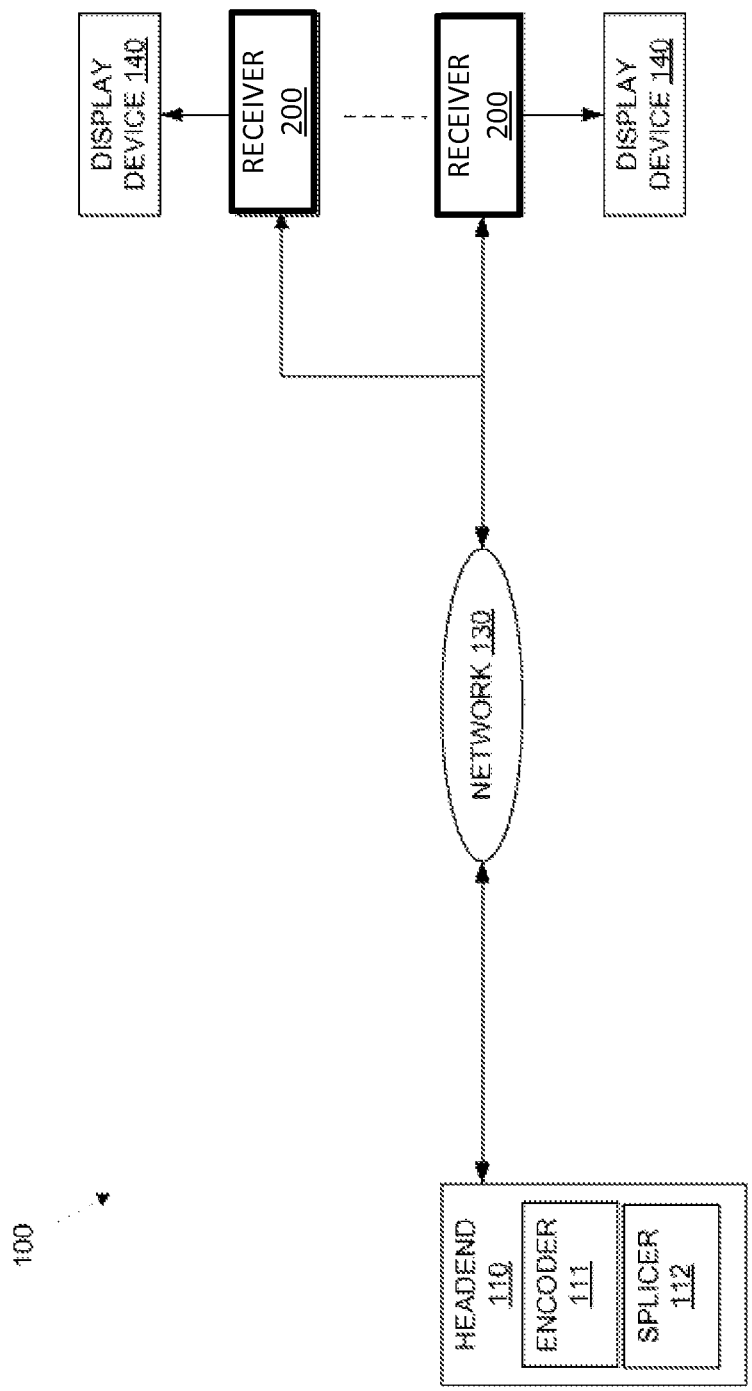
FIG. 1 is a high-level block diagram depicting an example environment in which embodiments of the present disclosure may be practiced.

Embodiments of the present disclosure describes methods and systems for generating, receiving, and/or processing a bitstream comprising at least a first coded video sequence (CVS), the first CVS comprising a first flag that indicates whether each of a plurality of sub-layers in a CVS has a respectively corresponding set of sub-layer parameters or whether a common set of sub-layer parameters corresponds to the plural sub-layers, wherein each sub-layer corresponds to a respective temporal identifier value.

DESCRIPTION OF EXAMPLE EMBODIMENTS

In systems that provide video programs such as subscriber television networks, the internet or digital video players, a device capable of providing video services or video playback includes hardware and software necessary to input and process a digital video signal to provide digital video playback to the end user with various levels of usability and/or functionality. The device includes the ability to receive or input the digital video signal in a compressed format, wherein such compression may be in accordance with a video coding specification, decompress the received or input digital video signal, and output the decompressed video signal. A digital video signal in compressed form is referred to herein as a bitstream that contains successive coded video sequences.

The HEVC Specification, also known Rec. "ITU-T H.265" (published April 2013) is incorporated by reference. In some embodiments of the present disclosure, a bitstream may be received at a receiver, such as receiver 200 described below in further detail. The bitstream may comprise successive CVSes. Each CVS in the bitstream has a corresponding Sequence Parameter Set (SPS) that includes Video Usability Information (VUI). CVSesOther network equipment, such as a splicer or Digital Program Inserter, may substitute portions of the bitstream with other CVSes.

A video coding standard may derive a temporal identifier from the NAL unit header, which indicates a level in a hierarchical temporal prediction structure. This was introduced to achieve temporal scalability without the need to parse parts of the bitstream other than the NAL unit header.

Under certain circumstances, the number of decoded temporal sub-layers can be adjusted during the decoding process of one CVS. The location of a point in the bitstream at which sub-layer switching is possible to begin decoding some higher temporal layers can be indicated by the presence of certain type of pictures, as a non-limiting example, in HEVC, these pictures could correspond to temporal sublayer access (TSA) pictures and stepwise TSA (STSA) pictures. At the location of such pictures, it may be possible to switch from decoding a first temporal sublayer to decoding a second temporal sublayer.

Sub-layer parameters corresponding to a CVS may be provided by a parameter set such as sequence parameter set (SPS) that corresponds to the CVS. The SPS may be provided in the bitstream prior to the RAP picture of the corresponding CVS.

In some embodiments, the SPS may include a flag to provision a conformance point for an entire CVS rather than a respective conformance point for each successive sub-layer.

As a non-limiting example, the flag may be expressed as a "sps_sub_layer_ordering Info_present_flag" to facilitate description of the method but it should be understood that in alternate embodiments it may be named differently. Specifically, for ease of explanation, the sps_sub_layer_ordering info_present_flag may be referred to herein with a name such as "first flag" to facilitate description of the method but it should be understood that in alternate embodiments the flag may be named different. The first flag may be signaled for each coded video sequence.

The first flag may signal whether each of the plural sub-layers in a CVS has a respectively corresponding set of sub-layer parameters, or a common set of sub-layer parameters is applicable to the plural sub-layers. For instance, the set of sub-layer parameters may include maximum number of frame buffers in the decoder picture buffer (DPB), maximum number of reorder pictures, and maximum latency increase. Each sub-layer may correspond to a respective temporal identifier value that is derived from the value of a data field provided in the NAL unit header. Throughout the description in this disclosure, temporal id, temporal_id, and temporal identification should be construed the same.

Each coded picture in the bitstream may correspond to an access unit that includes one or more NAL units. At least one NAL unit may correspond to a slice (or coded slice) of the coded picture. Each NAL unit includes a header that contains a NAL unit type. Plural NAL unit types may respectively correspond to different slice types. Some NAL unit types may correspond to information other than coded slices. A coded picture may contain one or more coded slices. When a coded slice corresponds to the full picture resolution, the access unit corresponding to the coded picture may contain only one coded slice.

A RAP picture is an Intra coded picture (i.e. comprising only of coded Intra slices). Plural NAL unit types respectively correspond to plural types of RAP pictures. Some Intra pictures may not be RAP pictures. The NAL unit type of the RAP picture that starts a CVS identifies the type of RAP picture that corresponds to this RAP picture.

The NAL unit header may include a data field corresponding to "nuh_temporal_id_plus1". The value of nuh_temporal_id_plus1 minus 1 may specify the temporal identifier corresponding to the NAL unit. As such, a variable "TemporalId" may be specified as: TemporalId=nuh_temporal_id_plus1−1.

A bitstream includes one or more consecutive CVSes. Each AU in a CVS corresponds to a respective coded picture. Each AU in a CVS has one or more NAL units. Some NAL units correspond to coded slice data, whereas others do not and may correspond, for example, to parameter sets. The NAL units that correspond to coded slice data are referred to as video coding layer (VCL) NAL units, whereas the other NAL units are referred to as non-VCL NAL units.

The NAL units may correspond accordingly to a certain type of information in its payload and identify such information in the header of the NAL unit so that the payload is identifiable. The temporal id of an AU may be referred to as the temporal id corresponding to that picture. A picture may be said to belong to a sub-layer that corresponds to the respective temporal id value derived from the value of a data field provided in the NAL unit header, where the data field corresponds to temporal id information.

In some embodiments of the present disclosure, the parameter set which carries the first flag is the sequence parameter set (SPS). The first flag is provided for each CVS in the bitstream by providing a value for the first flag in a corresponding data field of the SPS that corresponds to each CVS. When the first flag equals a first value in the SPS, all of the sub-layers of the CVS that use (or reference) that SPS have a common set of sub-layer parameters. When the first flag equals a second value in the SPS, said second value different than the first value, each of the sub-layers of the CVS that use (or reference) that SPS have a respective set of sub-layer parameters.

In alternate embodiments, when the first flag provided in the SPS equals a first value, only one set of sub-layer parameters is provided in the SPS. Furthermore, when the first flag provided in the SPS is not equal to the first value, one or more sets of sub-layer parameters is provided in the SPS. In the latter case, each of the one or more sets of sub-layer parameters provided in the SPS corresponds to a respective sub-layer, each sub-layer being identified by a respectively corresponding temporal id.

Each temporal id corresponds to a respective sub-layer in the CVS. In some embodiments, each respective temporal id, or temporal layer, may correspond to a respective sub-layer or temporal sub-layer in the CVS. Each successive temporal id value corresponds to a successive temporal sub-layers with the same temporal id value.

The temporal id values corresponding to reference pictures may start with a predetermined value for instance, zero. One or more temporal id values corresponding to non-reference pictures may be greater than the maximum temporal id value corresponding to a reference picture.

In some embodiments, respective values of the first flag may indicate the absence or presence of specific types of Video Coding Layer (VCL) NAL units in the CVS, such as NAL unit types corresponding to TSA and STSA units, as specified in the HEVC Specification. Additionally, a first value of the first flag may specify that TSA and STSA unit types shall not be present in the CVS and the temporal_id_nesting_flag is inferred equal to predetermined value (such as 0). The temporal_id_nesting_flag may be a data field provided in the SPS. In alternate embodiments, the value of the first flag may be constrained to a first value for all CVSes and NAL unit types corresponding to TSA and STSA are not permitted.

In some embodiments, the first flag may be constrained to a first value in all CVSes of the bitstream to indicate that switching from one sub-layer to a different sub-layer in the CVS is not permitted. In alternate embodiments, the first flag may correspond to the "sps_temporal_id_nesting_flag", as specified in the HEVC specification. In alternate embodiments, the first flag may indicate whether a specific parameter set is ignored or not during the decoding of the bitstream. For instance, the specific parameter set may correspond to the Video Parameter Set (VPS), as specified in the HEVC specification.

In some embodiments, when the first flag has a second value in the SPS corresponding to a CVS, the first flag signals the presence in the SPS of a respective set of sub-layer parameters for each of the sub-layers of the CVS. In such case, the set of sub-layer parameters corresponding to each successive sub-layer in the CVS is provided in the SPS. When the first flag has a value in the SPS corresponding to a CVS that is not the second value, it may signal the presence in the SPS of a single set of sub-layer parameters for the CVS.

The SPS includes a data field corresponding to "sps_max_sub_layers_minus1". The value of sps_max_sub_layers_minus1 plus 1 specifies the maximum number of temporal sub-layers that may be present in each CVS that refer to the information provided in that SPS. The value of sps_max_ sub_layers_minus1 may be in a specific range, in accordance with the video coding specification such as HEVC Specification.

A variable "HighestTid", which may identify the value of the highest temporal sub-layer, is specified as equal to sps_max_sub_layers_minus1, unless the value of HighestTid is provided by external means. The value of "sps_max_sub_layers_minus1" plus 1 provided in the SPS may specify the maximum number of temporal sub-layers that may be present in each coded video sequence referring to the sequence parameter set.

In some embodiments the set of sub-layer parameters provided in the SPS may correspond to the data fields, "sps_max_num_reorder_pics", "sps_max_dec_pic_buffering", and "sps_max_latency_increase".

sps_max_num_reorder_pics[i] may indicate the maximum allowed number of pictures preceding any picture in decoding order and succeeding that picture in output order when HighestTid is equal to i. The value of sps_max_num_reorder_pics[i] may be in the range of a value (such as 0) to sps_max_dec_pic_buffering[i], inclusive. When the value of i is greater than that value (such as 0), sps_max_num_reorder_pics[i] may be greater than or equal to sps_max_num_reorder_pics[i−1]. The value of sps_max_num_reorder_pics[i] may be less than or equal to vps_max_num_reorder_pics[i] for each value of i. In some embodiments, the value of sps_max_num_reorder_pics[i] has a default meaning or value when the first flag equals a first value.

When sps_max_latency_increase[i] is not equal to a value (such as 0) the value of MaxLatencyPictures[i] may be computed as specified by setting MaxLatencyPictures[i] equal to sps_max_num_reorder_pics[i]+sps_max_latency_increase[i]. When sps_max_latency_increase[i] is not equal to a value (such as 0), the value of MaxLatencyPictures[i] specifies the maximum number of pictures that can precede any picture in the coded video sequence in output order and follow that picture in decoding order when HighestTid is equal to i.

When sps_max_latency_increase[i] is equal to a value (such as 0), no corresponding limit may be expressed. The value of sps_max_latency_increase[i] shall be in a specific range in accordance with the video coding specification such as HEVC Specification. The value of sps_max_latency_increase[i] shall be less than or equal to vps_max_latency_increase[i] for each value of i. In some embodiments, sps_max_latency_increase[i] has a default meaning or value when the first flag equals a first value.

A slice header within a particular CVS contains a data field corresponding to the no_output_of_prior_pics_flag. The no_output_of_prior_pics_flag specifies how the previously-decoded pictures in the decoded picture buffer are treated after decoding of a RAP picture such as an IDR or a BLA picture. When the value of pic_width_in_luma_samples or pic_height_in_luma_samples or the maximum size of the decoded picture buffer corresponding to the HighestTid derived from the active sequence parameter set is different from the value of pic_width_in_luma_samples or pic_height_in_luma_samples or the maximum size of the decoded picture buffer corresponding to HighestTid derived from the sequence parameter set active for the preceding picture, a no_output_of_prior_pics_flag equal to 1 may (but should not) be inferred by the decoder, regardless of the actual value of no_output_of_prior_pics_flag. The determination of a value for no_output_of_prior_pics_flag is discussed in further detail in co-pending U.S. patent application Ser. No. 14/050,276, incorporated by reference in its entirety.

FIG. 1 is a high-level block diagram depicting an example environment in which one or more embodiments of the present disclosure may operate. In particular, FIG. 1 is a block diagram that depicts an example video transmission system 100. In this example, the video transmission system 100 may include a headend 110 and one or more receivers 200. In some embodiments of the present disclosure, a receiver 200 may house a video decoder. Receiver 200 may be coupled to a communications network or storage device, and receives, acquires, or is provided a bitstream corresponding to a video signal. Receiver 200 may further contain an output video port coupled to a display device. Receiver 200 may set and provide an output video signal via the output video port upon receiving or acquiring a video program containing a bitstream (i.e., video stream). In some embodiments, the corresponding physical output clock of the video port coupled to the display device may be set and maintained constant upon the receiver acquiring or receiving the bitstream. Herein a bitstream may also be referred to as a video stream. In some embodiments, a video stream may be acquired by a receiver that tunes to a television channel providing video programs.

Receivers 200 and the headend 110 are coupled via a network 130. The headend 110 and the receivers 200 cooperate to provide a user with digital television services, including, for example, television programming, interactive program guide (IPG) services, video-on-demand (VOD), and pay-per-view, as well as other digital services such as music, Internet access, commerce (e.g., home-shopping), voice-over-IP (VoIP), and/or other telephone or data services.

A receiver 200 may be a stand-alone unit or integrated into another device such as, for example, a display device 140, a personal computer, personal digital assistant (PDA), mobile phone, among other devices. In other words, receiver 200 (also referred to herein as a digital receiver or processing device or digital home communications terminal (DHCT)) may comprise one of many devices or a combination of devices, such as a set-top box, television with communication capabilities, cellular phone, personal digital assistant (PDA), or other computer or computer-based device or system, such as a laptop and personal computer, among others. As set forth above, receiver 200 may be coupled to display device 140 (e.g., computer monitor, television set, etc.), or in some embodiments, may comprise an integrated display (with or without an integrated audio component).

Receiver 200 may receive signals (video, audio and/or other data) including digital video signals in a compressed representation of a digitized video signal such as, for example, HEVC bitstreams, from headend 110 through the network 130, and provides reverse information to headend 110 through the network 130. As explained further below, receiver 200 comprises, among other components, a video decoder and a reconfigurable decoded picture buffer (DPB).

Digital television services are presented via respective display devices 140, each which typically comprises a television set that, according to its type, is driven with an interlaced scan video signal or a progressive scan video signal. However, the display devices 140 may also be any other device capable of displaying video images including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or receiver 200.

Although shown communicating with a display device 140, receiver 200 may communicate with other devices that receive, store, and/or process video streams from receiver 200, or that provide or transmit video streams or uncompressed video signals to receiver 200.

Headend 110 may include one or more server devices (not shown) for providing digital video, audio, and other types of media or data to client devices such as, for example, receiver 200. Headend 110 may receive content from sources external to headend 110 or the video transmission system 100 via a wired and/or wireless connection (e.g., satellite or terrestrial network), such as from content providers.

Headend 110 also includes one or more encoders (encoding devices or compression engines) 111 (one shown) and one or more video processing devices embodied as one or more splicers 112 (one shown) coupled to encoder 111. In some embodiments, encoder 111 and splicer 112 may be co-located in the same device and/or in the same locale (e.g., both in the headend 110 or elsewhere), while in some embodiments, encoder 111 and splicer 112 may be distributed among different locations within the video transmission system 100. For instance, though shown residing at headend 110, encoder 111 and/or splicer 112 may reside in some embodiments at other locations such as a hub or node.

Encoder 111 may provide one or more CVSes of the bitstream received by receiver 200. Other network equipment, such as splicer 112 or a Digital Program Inserter, may substitute portions of the bitstream with one or more replacement CVSes that have different corresponding parameter sets.

Figure 2A:
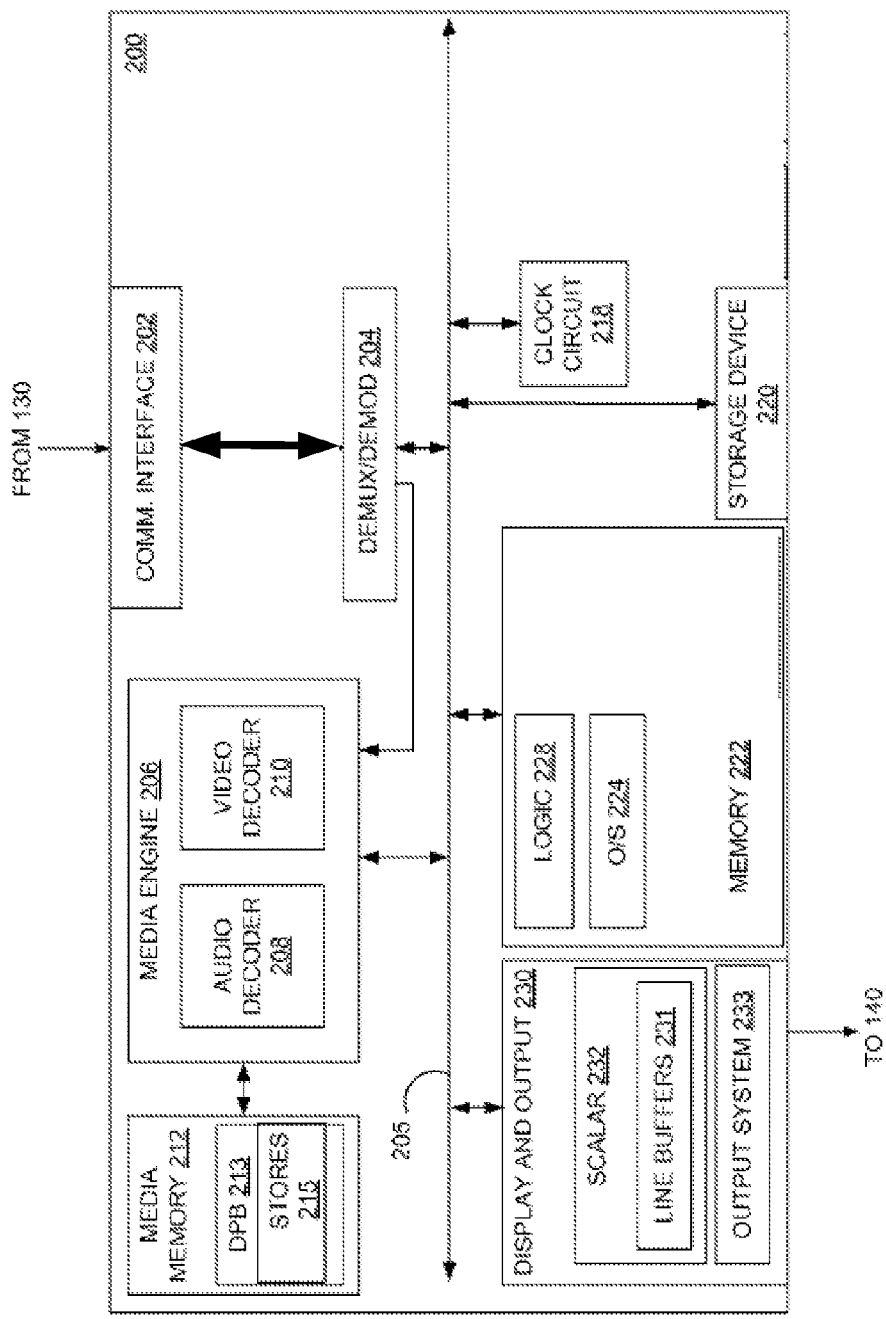
FIGS. 2A-2B are a block diagram of an embodiment of a receiver as depicted in FIG. 1 and related equipment, in which embodiments of the present disclosure may be implemented.

FIG. 2A is an example embodiment of select components of a receiver 200. It should be understood by one having ordinary skill in the art that receiver 200 shown in FIG. 2A is merely illustrative, and should not be construed as implying any limitations upon the scope of the disclosure.

Receiver 200 includes a communication interface 202 coupled to a multiplexing/demodulation system 204 (herein, simply demux 204 for brevity). Demux 204 may include MPEG-2 transport demultiplexing capabilities. When receiving a digital bitstream, demux 204 enables the separation of packets of data, corresponding to the desired video stream, for further processing.

Demux 204 is coupled to a bus 205 and to a media engine 206. The media engine 206 comprises, in one embodiment, decoding logic comprising one or more of a respective audio decoder 208 and video decoder 210. The media engine 206 is further coupled to the bus 205 and to a media memory 212, the latter which, in one embodiment, comprises one or more respective buffers for temporarily storing compressed (compressed picture buffer or bit buffer, not shown) and/or reconstructed pictures (decoded picture buffer or DPB 213). The DPB 213 includes multiple stores 215, the quantity of which is configured and fixed for a currently viewed channel in advance of receiving pictures from a bitstream. In some embodiments, one or more of the buffers of the media memory 212 may reside in other memory (e.g., memory 222, explained below) or components.

Receiver 200 further comprises additional components coupled to the bus 205 (though shown as a single bus, one or more buses are contemplated to be within the scope of the embodiments). For instance, receiver 200 further comprises a clock circuit 218 comprising phase and/or frequency locked-loop circuitry to lock into a system time clock (STC) from a program clock reference, or PCR, received in the video stream to facilitate decoding and output operations. Explicit PTS/DTS values and extrapolated values (for PTS and DTS) are compared to the reconstructed STC (generated by the clock circuit 218) to assist a determination of when the buffered compressed pictures are provided to the video decoder 210 for decoding (DTS) and when the buffered, decoded pictures are output by the video decoder 210 (PTS) to display and output logic 230 for processing and subsequent presentation on a display device 140. In some embodiments, clock circuit 218 may comprise plural (e.g., independent or dependent) circuits for respective video and audio decoding operations and output processing operations. Although described in the context of hardware circuitry, some embodiments of clock circuit 218 may be configured as software (e.g., virtual clocks) or a combination of hardware and software. Further, in some embodiments, clock circuit 218 is programmable.

Receiver 200 may further comprise a storage device 220 (and associated control logic as well as one or more drivers in memory 222) to temporarily store buffered media content and/or more permanently store recorded media content. Storage device 220 may be coupled to bus 205 via an appropriate interface (not shown), as should be understood by one having ordinary skill in the art. Memory 222 in receiver 200 comprises volatile and/or non-volatile memory, and is configured to store executable instructions or code associated with an operating system (O/S) 224 and other applications.

Receiver 200 is further configured with display and output logic 230, as indicated above, which includes a scalar 232, line buffers 231, and one or more output systems (e.g., configured as HDMI, DENC, or others well-known to those having ordinary skill in the art) 233 to process the decoded pictures and provide for presentation (e.g., display) on display device 140. In some embodiments, scalar 232 may be configured as one or more sample rate converters.

Figure 2B:
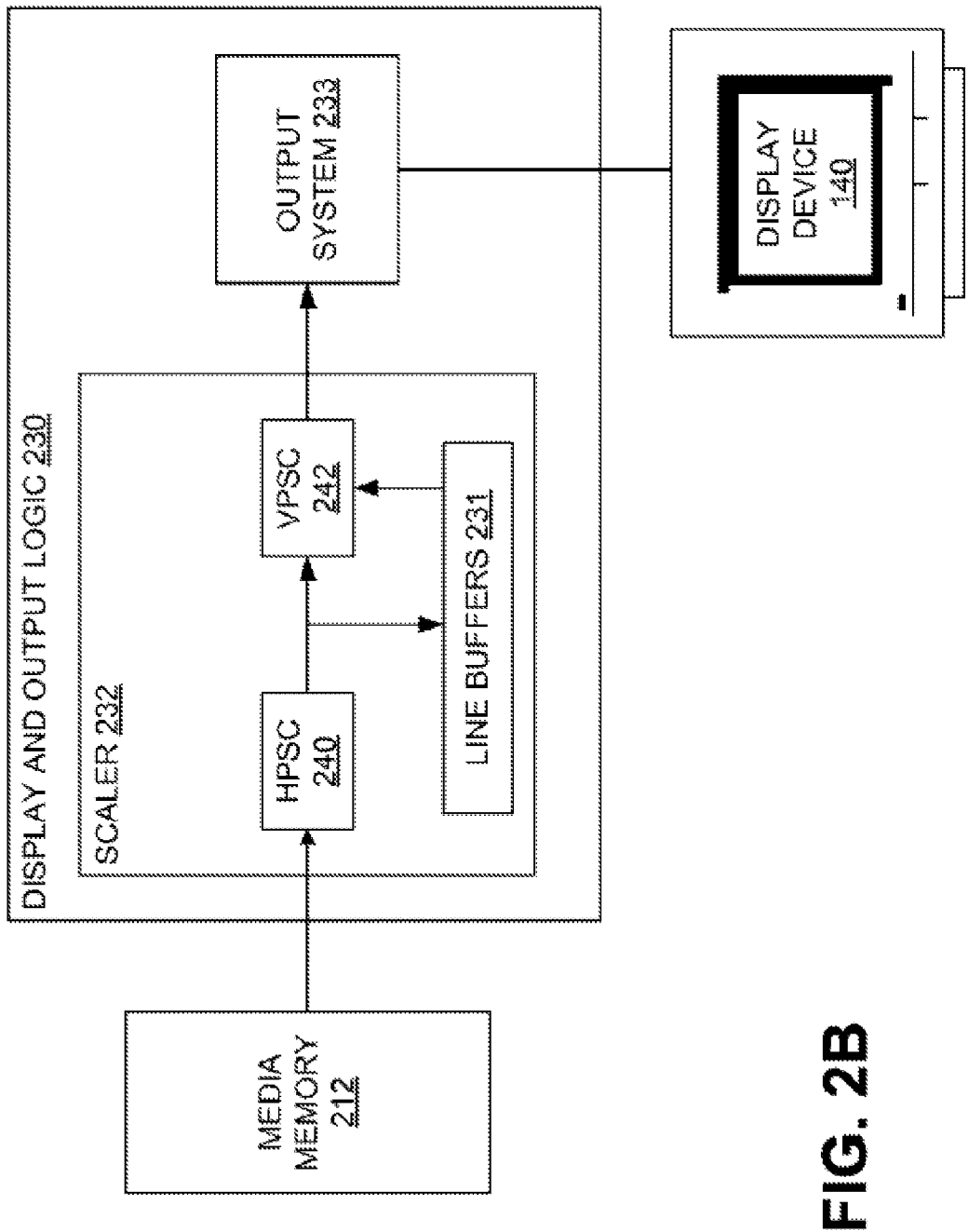

FIG. 2B shows a block diagram of one embodiment of display and output logic 230. It should be understood by one having ordinary skill in the art that display and output logic 230 shown in FIG. 2B is merely illustrative, and should not be construed as implying any limitations upon the scope of the disclosure. For instance, in some embodiments, display and output logic 230 may comprise a different arrangement of the illustrated components and/or additional components not shown, including additional memory, processors, switches, clock circuits, filters, and/or samplers, graphics pipeline, among other components as should be appreciated by one having ordinary skill in the art in the context of the present disclosure.

Further, though shown conceptually in FIG. 2A as an entity separate from the media engine 206, in some embodiments, one or more of the functionality of the display and output logic 230 may be incorporated in the media engine 206 (e.g., on a single chip) or elsewhere in some embodiments. As explained above, the display and output logic 230 comprises in one embodiment scalar 232 and one or more output systems 233 coupled to scalar 232 and the display device 140.

Scalar 232 may comprise a display pipeline including Horizontal Picture Scaling Circuit (HPSC) 240 configured to perform horizontal scaling, and a Vertical Scaling Picture Circuit (VPSC) 242 configure to perform vertical scaling. In one embodiment, the input of VPSC 242 is coupled to internal memory corresponding to one or more line buffers 231, which are connected to the output of HPSC 240. Line buffers 231 serve as temporary repository memory to effect scaling operations.

In one embodiment, under synchronized video timing and employment of internal FIFOs (not shown), reconstructed pictures may be read from the DPB and provided in raster scan order, fed through the scalar 232 to achieve horizontal and/or vertical scaling, and the scaled pictures are provided (e.g., in some embodiments through an intermediary such as a display buffer located in media memory 212) to an output port 233 according to the timing of a physical clock (e.g., in clock circuit 218 or elsewhere) driving the output system 233. In some embodiments, vertical downscaling may be implemented by neglecting to read and display selected video picture lines in lieu of processing by VPSC 242. In some embodiments, upon a change in the vertical resolution of the picture format, vertical downscaling may be implemented to all, for instance where integer decimation factors (e.g., 2:1) are employed, by processing respective sets of plural lines of each picture and converting them to a corresponding output line of the output picture.

One having ordinary skill in the art should understand that receiver 200 may include other components not shown, including decryptors, samplers, digitizers (e.g., analog-to-digital converters), multiplexers, conditional access processor and/or application software, driver software, Internet browser, among others. Further, though the logic 228 is illustrated as residing in memory 222, it should be understood that all or a portion of such logic 228 may be incorporated in, or distributed among, the media engine 206, the display and output system 230, or elsewhere. Similarly, in some embodiments, functionality for one or more of the components illustrated in, or described in association with, FIG. 2A may be combined with another component into a single integrated component or device.

In one embodiment, under synchronized video timing and employment of internal FIFOs (not shown), reconstructed pictures may be read from the DPB, fed through the scalar 232 to achieve the horizontal and/or vertical scaling necessary to effect the same planar span as implied by a CVS.

Figure 3:
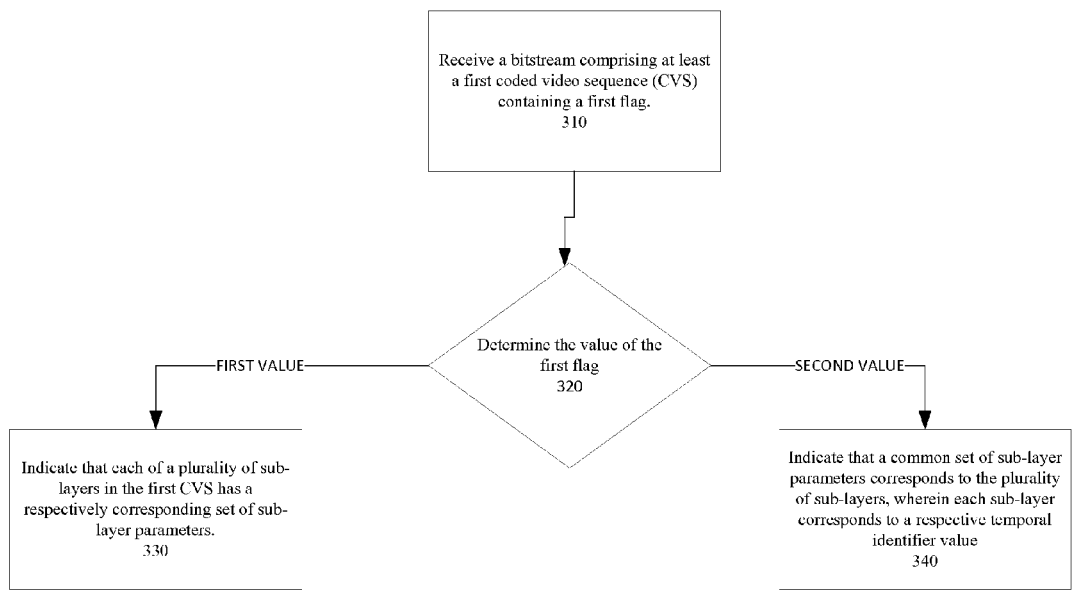
FIG. 3 is a flowchart illustrating embodiments of the present disclosure.

FIG. 3 is a flow chart illustrating embodiments of the present disclosure. Method 300 is a method for processing a first flag received within a bitstream. Method 300 may start at step 310 where a bitstream may be received. The bitstream may comprise at least a first coded video stream (CVS). The first CVS may contain the first flag. In some embodiments, the first flag may be located in a corresponding data field of the sequence parameter set (SPS) that corresponds to the first CVS. In some embodiments, the first flag may correspond to a sps_temporal_id_nesting_flag. In some embodiments, the specific parameter may corresponds to the Video Parameter Set (VPS).

Method 300 may proceed to step 320 where the value of the first flag may be Determined. If the value of the first flag equals a first value, method 300 may proceed to step 330. If the value of the first flag is equal to a second value different than the first value, method 300 may proceed to step 340.

Furthermore, in some embodiments, the first flag may indicate the absence or presence of specific types of VCL NAL units in the CVS. The specific types may include NAL unit types corresponding to TSA and STSA unit types. As such, a first value of the first flag may specify that the TSA and STSA unit types are not present in the CVS. In some embodiments of the present disclosure, method 300 may refuse to permit NAL unit types corresponding to TSA and STSA when the value of the first flag is constrained to a first value for all CVSes.

At step 330, the first value for the first flag may indicate that each of a plurality of sub-layers in the first CVS has a respectively corresponding set of sub-layer parameters. In some embodiments, sps_max_num_reorder_pics[i] has a default value when the first flag equals a first value. Additionally, the first flag may indicate whether a specific parameter set is ignored or not during the decode process of the bitstream.

Alternatively, at step 340, a second value for the first flag may indicate that a common set of sub-layer parameters corresponds to the plurality of sub-layers, wherein each sub-layer corresponds to a respective temporal identifier value. In some embodiments, each of the one or more sets of sub-layer parameters may correspond to a respective sub-layer. Similarly, each sub-layer may be identified by a respectively corresponding temporal id. The corresponding temporal id may be derived from the value of a data field provided in a NAL unit header.

Figure 4:
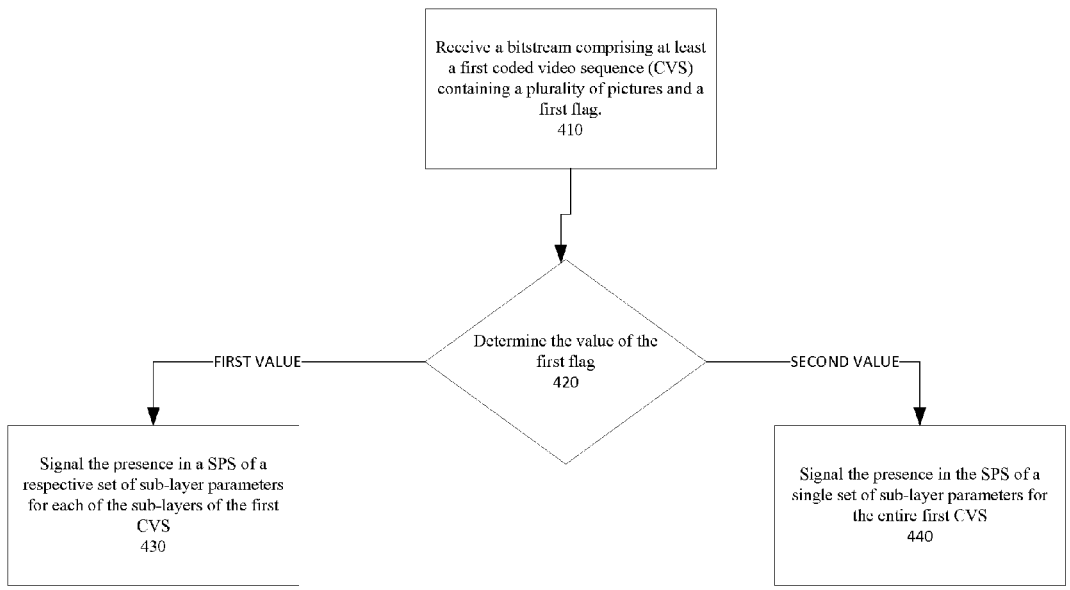
FIG. 4 is a flowchart illustrating embodiments of the present disclosure.

FIG. 4 is a flow chart illustrating embodiments of the present disclosure. Method 400 is a method for processing a first flag received within a bitstream. Method 400 may begin at step 410 where a bitstream may be received by a receiver, such as receiver 200. The bitstream may contain at least a first CVS with a plurality of pictures. For example, the bitstream may be provided in response to a user requesting digital programming at receiver 200. The first CVS may carry a corresponding first flag, such as the sps_temporal_id_nesting_flag in HEVC.

Method 400 may proceed to step 420 where the value of the first flag may be Determined. In some embodiments, the first flag may be set to at least a first value and a second value different from the first value. If at step 420 the first flag has a first value, method 400 may proceed to step 430. If at step 400 the first flag has a second value, method 400 may proceed to step 440.

At step 430, method 400 may signal the presence in a SPS of a respective set of sub-layer parameters for each of the sub-layers of the first CVS. Alternatively, at step 440, method 400 may signal the presence in the SPS of a single set of sub-layer parameters for the entire first CVS. For instance, the set of sub-layer parameters may include a maximum number of frame buffers in the decoder picture buffer (DPB), a maximum number of reorder pictures, and a maximum latency increase. Each sub-layer may correspond to a respective temporal identifier value that is derived from the value of a data field provided in the NAL unit header.

Although the description has been described with respect to particular embodiments thereof, these particular embodiments are merely illustrative, and not restrictive. For example, although a specific application has been described, it is possible to adapt features of the disclosed embodiments for other applications. Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in some embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

The foregoing description of illustrated particular embodiments, including what is described in the Abstract, is not intended to be exhaustive or to limit the invention to the precise forms disclosed herein. While specific particular embodiments of various equivalent modifications are possible within the spirit and scope, as those skilled in the relevant art will recognize and appreciate. As indicated, these modifications may be made to the present systems and methods in light of the foregoing description of illustrated particular embodiments and are to be included within the spirit and scope.

Thus, while the various systems and methods has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the various embodiments are not be limited to the particular terms used in following claims and/or to the particular embodiment disclosed as the best mode contemplated for carrying out the systems and methods, but that the certain embodiments will include any and all particular embodiments and equivalents falling within the scope of the appended claims.

We claim:

1. A method comprising:
receiving a bitstream comprising a first coded video stream (CVS), the first CVS comprising a plurality of temporal sub-layers and a first flag having a value comprising at least one of the following: a first value and a second value, wherein the first value indicates that each of the plurality of sub-layers in the first CVS has a respectively corresponding set of sub-layer parameters, wherein the second value indicates that a common set of sub-layer parameters corresponds to the plurality of sub-layers, wherein a value of the first flag is provided in a sequence parameter set (SPS), wherein when the value of the first flag provided in the SPS is not equal to the first value, only one set of sub-layer parameters is provided in the SPS, wherein when the value of the first flag provided in the SPS equals the first value, more than one set of sub-layer parameters are provided in the SPS, each of the more than one set of sub-layer parameters corresponding to a respective sub-layer, each of the respective sub-layer being identified by a respectively corresponding temporal identifier, and wherein each of the plurality of sub-layers corresponds to a respective temporal identifier value;
switching decoding of the first CVS from a first temporal sub-layer to a second temporal sub-layer at a temporal sub-layer access picture of the first CVS;
determining the value of the first flag associated with the first CVS; and
determining a set of sub-layer parameters for the second temporal sub-layer based on the determined value of the first flag.

2. The method of claim 1, wherein the value for the first flag is located in a corresponding data field of the SPS that corresponds to the first CVS.

3. The method of claim 2, wherein when the first flag equals the first value, each of the plurality of sub-layers of the first CVS that reference the SPS have a common set of sub-layer parameters.

4. The method of claim 2, wherein when the first flag equals the second value different than the first value, all of sub-layers of the CVS that use that the SPS have a respective set of sub-layer parameters.

5. The method of claim 1, wherein the first flag indicates absence of specific types of video coding layer (VCL) network access layer (NAL) units in the CVS.

6. The method of claim 5, wherein the NAL unit types correspond to temporal sublayer access (TSA) and stepwise TSA (STSA) unit types.

7. The method of claim 6, wherein the first value of the first flag specifies that the TSA and STSA unit types are not present in the CVS.

8. The method of claim 6, further comprising refusing to permit the NAL unit types corresponding to the TSA and STSA unit types when the value of the first flag is constrained to the first value for all CVSes.

9. The method of claim 6, further comprising constraining the value of the first flag to the first value in all CVSes of the bitstream, wherein the first value indicates that switching from one sub-layer to a different sub-layer in the CVS is not permitted.

10. The method of claim 1, wherein the first flag corresponds to a sps_temporal_id_nesting_flag.

11. The method of claim 1, wherein the first flag indicates whether a specific parameter set is ignored during a decode process of the bitstream.

12. The method of claim 11, wherein the specific parameter set corresponds to a Video Parameter Set (VPS).

13. The method of claim 1, wherein sps_max_num_reorder_pics[i] has a default value when the first flag equals the first value.

14. The method of claim 1, further comprising deriving the respective temporal identifier value from the value of a data field provided in a NAL unit header.

15. A method comprising:
receiving a bitstream comprising a plurality of temporal sub-layers and a first flag corresponding to a coded video stream (CVS), the first flag having a value comprising at least one of the following: a first value and a second value, wherein the first value indicates that each sub-layers in the CVS has a respective set of sub-layer parameters, and wherein the second value indicates that a common set of sub-layer parameters corresponds to the sub-layers, wherein a value of the first flag is provided in a sequence parameter set (SPS), wherein when the value of the first flag provided in the SPS is not equal to the first value, only one set of sub-layer parameters is provided in the SPS, wherein when the value of the first flag provided in the SPS equals the first value, more than one set of sub-layer parameters are provided in the SPS, each of the more than one set of sub-layer parameters corresponding to a respective sub-layer, each of the respective sub-layer being identified by a respectively corresponding temporal identifier;

signalling the presence in a sequence parameter set (SPS) of the respective set of sub-layer parameters for each of the sub-layers of the CVS when the first flag has the second value;

signalling the presence in the SPS of a single set of sub-layer parameters for the CVS when the first flag has a value different than the second value;

switching decoding of the CVS from a first temporal sub-layer to a second temporal sub-layer at a temporal sublayer access picture of the CVS;

determining the value of the first flag associated with the CVS; and determining a set of sub-layer parameters for the second temporal sub-layer based on the determined value of the first flag.

16. The method of claim 15, wherein a set of sub-layer parameters comprises: a maximum number of frame buffers in the decoder picture buffer (DPB), a maximum number of reorder pictures, and a maximum latency increase.

17. A system comprising:
a memory;
a processor configured to execute steps stored in the memory, the steps comprising:
receiving a bitstream comprising at least a first coded video stream (CVS), the first CVS comprising a plurality of temporal sub-layers and a first flag having a value comprising at least one of the following: a first value and a second value, wherein the first value indicates that each of a plurality of sub-layers in a coded video sequence has a respectively corresponding set of sub-layer parameters, wherein the second value indicates that a common set of sub-layer parameters corresponds to each of the plurality of sub-layers, wherein a value of the first flag is provided in a sequence parameter set (SPS), wherein when the value of the first flag provided in the SPS is not equal to the first value, only one set of sub-layer parameters is provided in the SPS, wherein when the value of the first flag provided in the SPS equals the first value, more than one set of sub-layer parameters are provided in the SPS, each of the more than one set of sub-layer parameters corresponding to a respective sub-layer, each of the respective sub-layer being identified by a respectively corresponding temporal identifier, and wherein each sub-layer corresponds to a respective temporal identifier value;

switching decoding of the first CVS from a first temporal sub-layer to a second temporal sub-layer at a temporal sub-layer access picture of the first CVS;

determining the value of the first flag associated with the first CVS; and determining a set of sub-layer parameters for the second temporal sub-layer based on the determined value of the first flag.

18. The system of claim 17, wherein the value for the first flag is located in a corresponding data field of the SPS that corresponds to the first CVS.

19. The system of claim 17, wherein the first flag indicates absence of specific types of video coding layer (VCL) network access layer (NAL) units in the CVS, and wherein the NAL unit types correspond to temporal sublayer access (TSA) and stepwise TSA (STSA) unit types.

20. The system of claim 19, wherein the first value of the first flag specifies that the TSA and STSA unit types are not present in the CVS.

* * * * *